July 3, 1962  E. KRON  3,042,795
PHOTOCOPY MACHINE
Filed Oct. 1, 1958

*INVENTOR.*
EUGENE KRON
BY

ATTORNEY.

3,042,795
PHOTOCOPY MACHINE
Eugene Kron, Floral Park, N.Y., assignor to Nord Photocopy and Electronics Corp., Hyde Park, N.Y.
Filed Oct. 1, 1958, Ser. No. 764,721
1 Claim. (Cl. 240—2)

This invention relates to lighting means for combining direct and indirect light rays to provide a uniform light intensity on a predetermined plane.

More particularly the invention relates to means for providing uniform light intensity for a photocopy machine of the type which passes light through an original to a sensitized negative, or the type which passes light through a negative to the original, which are in contact on a predetermined copying plane.

One of the primary requirements for machines of this type is to provide uniform light intensity on the copying plane. This problem is complicated by the fact that the edges of the illuminated plane may be 20% to 25% further from the light source than the center of the plane.

Applicant has solved this problem by eliminating the shortest direct rays to the center of the plane and by combining longer direct rays with indirect rays in order to illuminate the center portion and provide a uniform intensity over the entire area.

This is done by placing an opaque spot at the bottom of the light bulb and mounting a reflector above and around the light bulb. The size of the spot and the mounting of the lamp and reflector is arranged so that indirect rays illuminate the center of the plane.

Accordingly, a principal object of the invention is to provide new and improved lighting means for combining direct and indirect light rays to provide a uniform light intensity on a predetermined plane.

Another object of the invention is to provide new and improved lighting means for photocopy machines.

Another object of the invention is to provide new and improved lighting means for photocopy machines comprising a lamp and reflector mounted a predetermined distance from the copying plane and means to cut off direct rays to the center of the copying plane.

Another object of the invention is to provide new and improved lighting means for photocopy machines comprising a lamp having an opaque spot on its bottom surface adapted to cut off the direct rays to the center of the copying plane and a reflector mounted above and around said lamp and adapted to indirectly illuminate the center portion of said copying plane.

These and other objects of the invention will become apparent from the following specification and drawings, of which:

Figure 1:
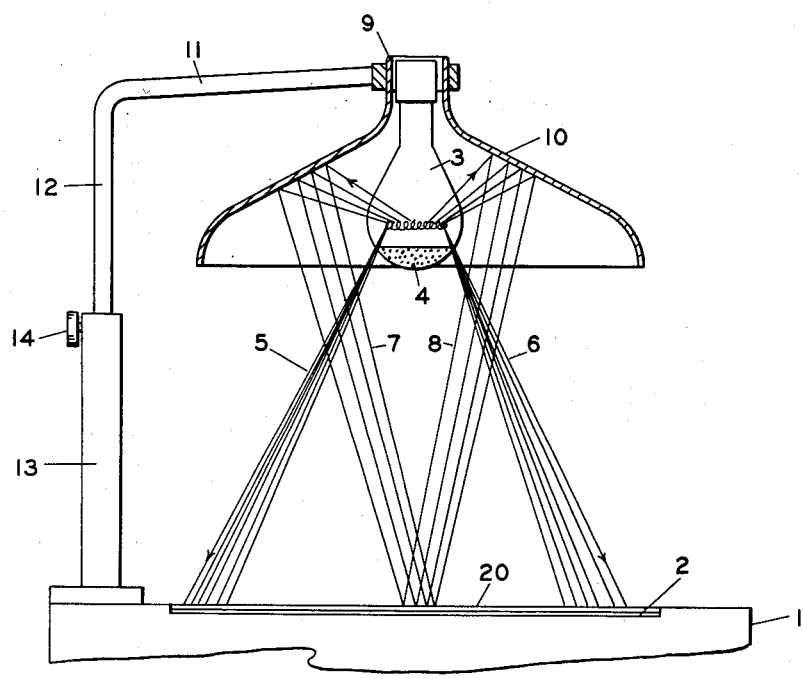
FIGURE 1 is an elevation view of an embodiment of the invention partially in section.

Referring to the drawings, there is shown a photocopy machine 1 of the type which prints on a sensitized negative by placing the original and negative together, preferably under pressure of a translucent sheet 20, on a predetermined copying plane 2 and passing light through the original onto the negative or through the negative reflexing off the original. In order to provide a good uniform copy it is, therefore, necessary that the light intensity be uniform on the copying plane 2. This problem is complicated by the fact that it is necessary to place the light source fairly close to achieve the necessary intensity and to limit the size of the machine. However, when this is done, direct rays from the center of the light source 3 to the center of the copying plane illuminate the center portion too much and the edge portions too little. This is because the distance to the edges of the copying plane are of the order of 20% to 25% further than to the center.

In order to achieve a uniform light intensity on the plane 2, applicant has applied an opaque spot 4 to the bottom of the light bulb 3. The term bottom does not imply that the bulb may not be inverted or mounted at an angle. The purpose of the spot is to cut off the direct rays to the center of the copying plane but to permit direct rays 5 and 6 to illuminate the edges of the copying plane. A reflector 10 is mounted above and around the light bulb 3 so as to illuminate the center portion of the copying plane with rays 7 and 8 with the same intensity as the edges of the copying plane. The reflector also serves to keep direct light away from the eyes of the operator. The light bulb 3 is mounted in a socket 9 in the neck of the reflector and the reflector is mounted on the horizontal arm 11, which in turn is mounted on a vertical mounting pipe. Therefore, the vertical height of the reflector and light may be adjusted by sliding the arm 12 in the pipe 13 and tightening the adjustment screw 14. For types of work requiring a predetermined light intensity, this adjustment may be preset.

Alternatively, the lamp may be permanently mounted at a predetermined height. The height of the mounting with respect to the copying plane and the size of the spot 4 must be chosen so that the direct and indirect rays will blend together where they overlap and provide a uniform intensity over the entire copying plane.

Figure 2:
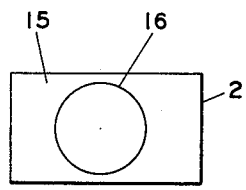
FIGURE 2 is a diagram illustrating the use of the invention.

FIGURE 2 shows a view of the copying plane 2 illustrating the edge areas 15 which are illuminated by the direct rays 5 and 6, and the center area 16 which is illuminated by the indirect rays 7 and 8. As mentioned above, the mounting and size of the spot 4 are chosen so that there is no visible line of demarcation between the direct and indirect rays.

Figure 3:
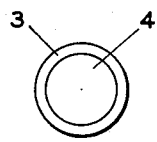
FIGURE 3 is a detail view illustrating the bottom of the light bulb.

FIGURE 3 shows a view of the bottom of the bulb 3 having the opaque spot 4. If desired, the inside surface of the opaque spot may have a mirrored surface for additional reflection where greater light intensity is desired. However, in that event the height of the mounting would have to be adjusted to match the center and edge illumination.

Therefore, the present invention provides lighting means which combines direct and indirect illumination to achieve a predetermined combination of direct and indirect lighting on a predetermined plane. The invention has been illustrated for use with a photocopy machine but is not so limited, but could be used wherever it is desired to combine direct and indirect lighting for the same or similar purposes.

The teaching of the present invention may also be used with multiple bulb light sources. The invention may also be used in inverted form with the light source below the copying plane or at any angle to the horizontal, provided the axis of the bulb is perpendicular to the copying plane.

I claim:

A photocopy machine of a type having a plane copying area comprising a light bulb centrally spaced above and in direct operating relation to said copying area, an opaque spot fixedly mounted on the bottom center of said bulb, the size of said opaque spot being chosen to cut off direct light from the center of said copying area but permitting direct light rays on the edges of said area, a reflector connected to and mounted symmetrically around and above said bulb to reflect indirect light rays to the center of said copying area, and means to match said direct and indirect rays including means to adjust the distance from said bulb to said plane, so that said direct and reflected light rays have substantially the same intensity to thereby provide uniform light intensity on said area.

References Cited in the file of this patent

UNITED STATES PATENTS

| | | |
|---|---|---|
| 1,875,981 | Blau | Sept. 6, 1932 |
| 1,974,982 | Christmas | Sept. 25, 1934 |
| 2,176,625 | Friedman | Oct. 17, 1939 |
| 2,327,818 | Peterson | Aug. 24, 1943 |
| 2,850,622 | Johnson | Sept. 2, 1958 |